United States Patent Office 2,721,186
Patented Oct. 18, 1955

2,721,186
POLYMERS OF N-CARBAMYLAMIC ACID ESTERS

Pliny O. Tawney, Passaic, N. J., assignor to United States Rubber Company, New York, N. Y., a corporation of New Jersey No Drawing. Application November 30, 1953,
Serial No. 395,282

10 Claims. (Cl. 260—23)

This invention relates to new polymers of esters of N-carbamylamic acids, derived from intramolecular anhydrides of alpha-olefinic alkenedioic acids, and to heteropolymers of such esters, with copolymerizable compounds having at least one terminal ethylenic group which, in the case of a plurality of such groups, are not conjugated with each other.

Some of these esters can be prepared, as disclosed in a copending application of Robert H. Snyder and Pliny O. Tawney, Serial No. 395,281, filed November 30, 1953, by reacting any of certain N-carbamylimides with a compound containing one or more non-tertiary alcoholic hydroxyl groups, i. e., primary or secondary alcoholic hydroxyl groups; the reaction preferably is run in the presence of a catalyst such as zinc chloride, cadmium chloride or ferric chloride, as disclosed in my copending application, Serial No. 395,283, filed November 30, 1953. The N-carbamylamic esters which are the subject of the said Snyder and Tawney application are (1) the esters which have a cis configuration if they are capable of cis-trans isomerism, and (2) the esters which are not capable of cis-trans isomerism.

The remaining esters used in my invention are the trans N-carbamylamic esters disclosed by Robert J. Kelly and Carl E. Bryan in a copending application, Serial No. 395,284, filed November 30, 1953. They prepare these trans esters either directly by reacting the N-carbamylimides derived from cis 2-butenedioic acids with a compound containing one or more non-tertiary alcoholic groups in the presence of aluminum chloride, or by isomerizing the corresponding isomeric cis esters in the presence of aluminum chloride, the amount of aluminum chloride ranging from about 0.5 to about 10 parts, by weight, based on the imide, or the cis ester.

The N-carbamylimides which I employ in my reaction have the structure

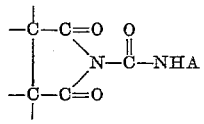

wherein A is hydrogen or a hydrocarbon radical, and any two of the remaining bonds are satisfied by hydrogen or acyclic hydrocarbon, and the remaining two bonds are so arranged that the molecule contains one olefinic group, i. e. >C=C<, connected directly to at least one of the carbonyl groups. These new N-carbamylimides are prepared, as shown in detail hereinafter, and in a copending application of Robert H. Snyder, Serial No. 367,108, filed July 9, 1953, which is a continuation-in-part of his application Serial No. 312,870, filed October 2, 1952, from the corresponding N-carbamylamic acids.

Typical N-carbamylimides for making the esters which are operable in my invention are N-carbamylmaleimide, N-carbamylitaconimide, N-carbamylcitraconimide, N-(ethylcarbamyl)-maleimide, N-(n-butylcarbamyl)-maleimide, N-(tertbutylcarbamyl)-maleimide, N-(phenylcarbamyl)-maleimide, N-(cyclohexylcarbamyl)-maleimide, N-(benzylcarbamyl)-maleimide, N-(ethylcarbamyl)-itaconimide, and N-(ethylcarbamyl)-citraconimide, N-carbamylmaleimide is the preferred member of this class, and the preferred N-carbamylamic esters of this invention are the maleurates. Therefore, N-carbamylmaleimide and the esters made therefrom will be used hereinafter in describing and illustrating my invention, except where otherwise stated specifically.

The formation of the maleurates is illustrated as follows:

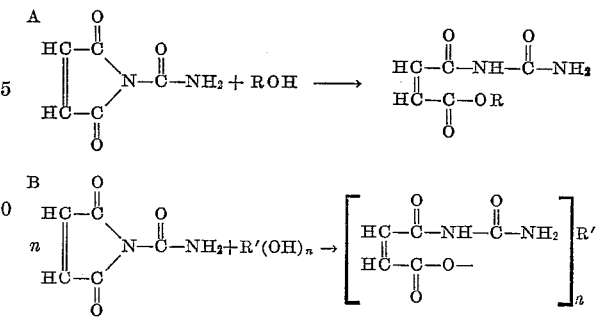

wherein R and R' are the residues of non-tertiary alcohols, which can contain one or more additional hydroxyl groups not involved in the esterification reactions A and B. The symbol $n$ is an integer.

The N-carbamylmaleamic esters are formed simply by reacting N-carbamylmaleimide and an alcohol, as aforesaid, in an appropriate solvent. This solvent usually is the alcohol taking part in the reaction, an excess being used over that converted to the ester.

However, when the reagent alcohol is one which boils at a very high temperature at atmospheric pressure, it is preferred to use the alcohol in little or no excess over that amount needed in the esterification, and to use with it an inert solvent which boils at a lower temperature than the alcohol, thereby simplifying the process of purifying the ester. Furthermore, in the special cases in which it is desired to react N-carbamylmaleimide with substantially all of the hydroxyl groups of a liquid polyhydric alcohol, or in which the alcohol is a solid which melts or decomposes above about 140° C., the use of an inert solvent is essential because the N-carbamylmaleimide, the alcohol, and/or the desired product normally are solid materials. p-Dioxan is a suitable solvent.

Each non-tertiary hydroxyl group of an alcohol can react with one molecule of an N-carbamylimide. For example, one molecule of N-carbamylmaleimide can react with ethylene glycol to form 2-hydroxyethyl maleurate, whereas two molecules of the imide can react with the glycol to form ethylene dimaleurate with or without the isolation of the intermediate 2-hydroxyethyl maleurate.

The trans esters, typified by the N-carbamyl-fumaramates are made by the same procedures used in making the corresponding cis esters except that aluminum chloride is present during the reaction between the N-carbamylimide and the alcohol, or is added to a solution of the preformed cis ester.

The temperature of esterification for making both the cis and trans esters and of isomerization for making the trans esters can be varied over a wide range, e. g., from about room temperature (20° C.) to about 140° C. The more active alcohols such as methanol and ethanol will react with N-carbamylmaleimide within a few minutes at room temperature especially when the mixture is stirred rapidly. The higher monohydric alcohols, e. g., 1-dodecanol, and the polyhydric alcohols react with N-carbamylmaleimide less rapidly, so that it is essential to heat the reaction mixture in order to carry out the esterification in a reasonable length of time. Above about 140° C. the yield of the desired ester decreases rapidly because of decomposition of N-carbamylmaleimide and/or the ester formed therefrom. For highest yield and purity of the ester it is preferred to hold the reaction temperature below about 110° C.

It is advisable to use substantially anhydrous reagents and solvents generally in the reaction, because N-carbamylimides, such as N-carbamylmaleimide, react with water to form N-carbamylamic acids such as N-carbamylmaleamic acid. This competing hydrolysis reaction usually appears to be at least as rapid as the desired esterification. Once the N-carbamylmaleamic acid is formed it cannot be esterified directly. Consequently, while one can obtain a substantial yield of, for example, ethyl N-carbamylmalemate from 95% ethyl alcohol, it is preferred to use absolute alcohol for maximum yield and purity of the ester. For the same reason, when making the trans esters directly from an N-carbamylimide, it is preferable to use anhydrous aluminum chloride rather than the hydrated form.

Typical alcohols which are operable in preparing the esters in the invention are monohydric aliphatic alcohols, e. g., methanol, ethanol, 1-propanol, 2-propanol, 1-butanol, 2-ethylhexanol, 1-dodecanol, 1-octadecanol; unsaturated alcohols, e. g., allyl alcohol and methallyl alcohol, halogenated alcohols, e. g., ethylene chlorhydrin; the nitro alcohols, e. g., 2-nitrobutanol-1; ether-alcohols, e. g., ethylene glycol monomethyl ether, and diethylene glycol monoethyl ether; cycloalkanols, e. g., cyclohexanol; aralkyl alcohols, e. g., benzyl alcohol; tertiary-amino alcohols, e. g., triethanolamine; the cyanoalcohols, e. g., beta-cyanoethanol; the alcohols formed by reduction of the carbon monoxide-olefin products made by the "oxo" process; the hydroxy acids and esters, e. g., glycolic acid; the polyhydric alcohols, e. g., ethylene glycol, the polyethylene glycols, polymeric alcohols which have been formed by oxidizing and then partially reducing isoolefin: conjugated diolefin copolymers, alkyd resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides; triglycerides containing one or more alcoholic hydroxyl groups, e. g., castor oil and "blown" oils made from oils such as soya and linseed oils; methylol phenols, e. g., 2,6-dimethylol 4-alkyl-phenols and their condensation polymers; N-methylol compounds, e. g., N-methylolmaleimide and N,N'-dimethylolurea; and alcohols containing sulfone groups, e. g., those alcohols made from a glycol and divinyl sulfone. Tertiary alcohols are not operable in my invention.

The N-carbamylamic esters of compounds containing non-teritary carbinol groups can, broadly, be subdivided into two major classes:

(A) Esters of monohydric alcohols; i. e., monoesters; and (B) Esters of polyhydric alcohols, which esters can be either mono- or di- or tri- or higher esters depending on the number of hydroxyl groups reacted.

Class B can be further separated into subclasses:

(B–1) Esters of polyhydric alcohols having more than two hydroxyls, e. g., esters of castor oil.

(B–2) Esters of polyhydric alcohols having only carbon and hydrogen atoms other than the hydroxyl groups, e. g., ethylene dimaleurate, and ethylene bis-(N-carbamylfumaramate).

(B–3) Esters of polyhydric alcohols having repeating ester groups, e. g., esters of an alkyd resin having terminal alcoholic hydroxyl groups.

(B–4) Esters of polyhydric alcohols having repeating alkylene ether groups, e. g., esters of polyglycol ethers.

(B–5) Esters of polyhydric alcohols containing sulfone groups, e. g., of complex glycols which are derived from a simple glycol and divinyl sulfone.

This classification is applicable to all of the esters used in my invention.

The preferred acids conforming to the class of N-carbamylimides

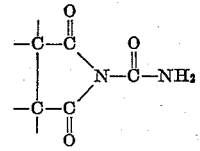

that are usable for preparation of each of the above classes of esters, broadly, as well as particularly, are maleic acid, citraconic acid, and itaconic acid. The corresponding N-carbamylimides are N-carbamylmaleimide, N-carbamylitaconimide, and N-carbamylcitraconimide.

The esters of class A; i. e., those made from monohydric alcohols, differ markedly from those of class B as monomers in forming the polymers of my invention. While all of the esters will form these polymers, the esters of polyhydric alcohols have a distinctive property not possessed by the esters of monohydric alcohols; namely, the extremely useful ability to form crosslinked heteropolymers which can form thermosettable coatings and castings which do not craze or shrink.

This valuable property can be used, for example, to make materials which are similar to, but superior to, polystyrene. This resin is one of the most useful plastic materials. It is cheap, transparent, capable of being dyed to form beautiful, clear articles in many color shades, easily and rapidly moldable into any of many desirable shapes, etc. However, it has three major deficiencies; namely, it is soluble in many organic liquids, it is a permanently thermoplastic material which softens at so low a temperature that articles made from it cannot be used above about 90° C., and it is brittle. I have now shown that these defects can be overcome by copolymerizing styrene with one, or a mixture of several, N-carbamylamic esters of polyhydric alcohols.

Presumably, this improvement is due to the formation of a three-dimensional macromolecular structure. As styrene is only difunctional, it cannot homopolymerize to form such a structure. However, an ester containing at least two N-carbamylamic groups is tetrafunctional, i. e., it can react with a difunctional monomer to form three-dimensional, i. e., crosslinked, materials.

In making such crosslinked heteropolymers, I prefer to use N-carbamylamic esters of a particular type of polyhydric alcohol; namely, an alkyd resin having terminal alcoholic hydroxyl groups. I have found that bis-(N-carbamylamic) esters made from such alkyds are especially useful for making tough and rigid or slightly flexible solid heteropolymers.

The alkyd resin, or mixture of alkyd resins, used in my invention can be made from any polycarboxylic acid, or mixture thereof, and any polyhydric alcohol or mixture thereof, provided only that the reaction conditions and the proportions of the acidic and alcoholic reagents are such as to cause the alkyd chains to terminate with free hydroxyl groups rather than with free carboxyl groups. Such alkyd resins and methods for making them are, of course, well known. It is also well known that by varying the reaction time at a given temperature the average molecular weight of the alkyd resin can be changed. As I show hereinafter, by varying the acid, the alcohol, or the molecular weight of the alkyd I can change the properties of the maleurate esters of the alkyd in order to form heteropolymeric materials fitted for many specific uses.

Typical polycarboxylic acids which can be used in making alkyds suitable for use in my invention are succinic acid, glutaric acid, adipic acid, pimelic acid, suberic acid, azelaic acid, sebacic acid, maleic acid, fumaric acid, citric acid, citraconic acid, itaconic acid, aconitic acid, phthalic acid, isophthalic acid, terephthalic acid, 3,6-endomethylene-1,2,3,6-tetrahydrophthalic acid, and mixtures thereof. The anhydrides of these acids, when available, are equivalent to the acids in making alkyds, and are generally used commercially in preference to the acids for economic reasons.

Typical polyhydric alcohols used in making the alkyds are ethylene glycol, propylene glycol, diethylene glycol, glycerol, 1,2,4-butanetriol, and mixtures thereof.

The N-carbamylimides used in my invention are made from the corresponding N-carbamylamic acids. Each of these is made from the anhydride of the appropriate dicarboxylic acid and a urea. A preferred method of carrying out the latter reaction is described in the co-pending application of Snyder, Serial No. 312,869, filed October 2, 1952. His method of making the N-carbamylamic acids and the N-carbamylimides therefrom is illustrated as follows:

A solution of 500 g. of maleic anhydride and 300 g. of urea in 1000 ml. of glacial acetic acid is heated at 50° C. for 12 hours, during which time maleuric acid begins to crystallize. The mixture is allowed to cool and is left overnight at room temperature. Then the white crystalline product is filtered, washed with glacial acetic acid, and dried at 50° C. The maleuric acid, 405 g., or 56% of theory, melts at 161–162° C. with decomposition.

Similarly, a urea is reacted in glacial acetic acid with an equivalent amount of an intramolecular anhydride of another alpha-olefinic alkenedioic acid to give the appropriate N-carbamylamic acid. Typical N-carbamylamic acids are the following:

N-carbamylitaconamic acid; M. P. about 200° C. with decomposition.
N-carbamylcitraconamic acid; M. P. about 145–149° C.
N-(n-butylcarbamyl)-maleamic acid; M. P. 105.5–107° C.
N-(tert-butylcarbamyl)-maleamic acid; M. P. 151.5–153.5° C.
N-(phenylcarbamyl)-maleamic acid; M. P. 162–163° C.

The anhydrides from which the N-carbamylamic acids are made are intramolecular, and are derived from dibasic acids having two carbon atoms separating the two carboxylic groups. The anhydrides also are olefinically unsaturated in a position alpha to at least one of the carbonyl groups.

Typical anhydrides wherein the olefinic group is in a position alpha to both carbonyl groups are maleic anhydride, citraconic anhydride, alpha-ethylmaleic anhydride and dimethylmaleic anhydride. The N-carbamylamic esters made from any of the above anhydrides can exhibit cis-trans isomerism. The use of esters having the cis configuration as well as those having the trans configuration is the subject of this invention.

Typical anhydrides wherein the olefinic group is in a position alpha to only one of the carbonyl groups; i. e., wherein the olefinic group does not constitute part of the hydrocarbon chain separating the carbonyl groups, are itaconic anhydride and beta-methylitaconic anhydride. The N-carbamylamic esters made from this class of anhydrides cannot exhibit cis-trans isomerism. The use of these esters also is the subject of this invention.

The urea for making the N-carbamylimides can be urea ($NH_2$—CO—$NH_2$) itself or a urea which has a hydrocarbon radical instead of one of the hydrogen atoms. This radical can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-sec-butylurea, N-isobutylurea, N-tert-butylurea, the N-amylureas, N-n-hexylurea, N-n-heptylurea, N-n-octylurea, N-(2-ethylhexyl)-urea, N-n-nonylurea, N-n-dodecylurea and N-n-octadecylurea. Typical alkenyl ureas are N-allylurea, N-methallylurea and N-crotylurea. A typical cycloalkyl urea is N-cyclohexylurea. A typical terpenyl urea is N-bornylurea. Typical aralkyl ureas are N-benzylurea and N-phenethylurea. Typical aryl ureas are N-phenylurea, the three N-tolylureas, and the two N-naphthylureas.

The N-carbamylamic acids are converted to the corresponding N-carbamylimides, as illustrated with maleuric acid:

A mixture of 50 parts of maleuric acid and 120 parts of glacial acetic acid is heated to about 80° C. Acetic anhydride (50 parts) is added gradually to the stirred mixture, which is held at the same temperature until practically all of the suspended maleuric acid has disappeared. The hot solution is filtered, and cooled to room temperature, causing crystallization of a white product. This material, the new compound N-carbamylmaleimide, melts at 157–158° C.

Similarly, each of other typical N-carbamylamic acids is converted to the corresponding N-carbamylimide:

N-carbamylitaconimide; M. P. 92–98° C.
N-carbamylcitraconimide; M. P. 110–115° C.
N-(n-butylcarbamyl)-maleimide; M. P. 66.5–68° C.

This white compound did not crystallize until the solution was evaporated, in vacuo, to about half volume. It was recrystallized from a mixture of benzene and Skellysolve B (a petroleum fraction which is chiefly n-hexane).

N-(tert-butylcarbamyl)-maleimide; M. P. 106.0–107.5° C.

This white compound did not crystallize until the solution was evaporated in vacuo to half volume. It was recrystallized from carbon tetrachloride.

N-(phenylcarbamyl)-maleimide; M. P. 140–141° C.

This pale yellow compound was recrystallized from benzene.

I have found that the N-carbamylamic esters can be copolymerized with compounds having one or more reactive terminal ethylenic groups, $H_2C=C<$, which, in the case of a plurality of such groups, are not conjugated with each other, to form new resins which are useful in making coatings, films, and castings. Typical of such copolymerizable compounds are styrene; the four isomeric methylstyrenes; vinyl acetate; vinyl chloride; isobutylene; 1,5-hexadiene; allyl acetate; methallyl acetate; methyl vinyl ketone; methyl vinyl ether; isopropenyl acetate; the acrylic type of esters, acids, amides and nitriles; and the monovinyl pyridines.

The acrylic-type nitriles, amides, acids and esters are those having the structure

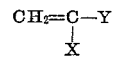

wherein X is hydrogen or methyl, and Y is —CN,

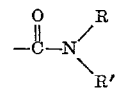

or —COOR, R and R' being hydrogen, alkyl or aralkyl groups. The preferred monomers of this type are acrylonitrile, methyl acrylate and methyl methacrylate. Other important monomers are acrylamide, ethyl acrylate, butyl acrylate, 2-ethylhexyl acrylate, ethyl methacrylate, acrylic acid and methacrylic acid.

The monovinylpyridines can be unsubstituted or can be alkyl-substituted. Typical vinylpyridines are 2-, 3-, and 4-vinylpyridine, 2-methyl-5-vinylpyridine, 5-ethyl-2-vinylpyridine, 2-methyl-6-vinylpyridine and 2-ethyl-4-vinylpyridine.

These comonomers having reactive $CH_2=C<$ groups are not equivalent among themselves in my invention. Those comonomers in which the $CH_2=C<$ group is directly attached to a negative group are particularly valuable because of the ease with which they copolymerize with the N-carbamylamic esters and because of the extremely great utility of the products so formed. Typical negative groups are aromatic ring hydrocarbon groups, carboxylic acid and ester groups, amide groups, the nitrile group, the chloride group, carbonyl groups forming part of an aldehyde or ketone, and alkoxy groups.

The copolymerizable compounds, such as the allylic compounds, which do not contain a negative group directly attached to the CH₂=C< group, although operable in my invention, usually react somewhat less rapidly with an N-carbamylamic ester than do the preferred comonomers, and the products are ordinarily not as hard and tough as those made from the preferred comonomers.

The copolymers of this invention can be mixed with fillers, dyes, plasticizers, and other materials conventionally used in the plastic resin industry in order to modify the properties of the products to fit individual applications. Customarily, I incorporate such optional ingredients into the copolymerizable mixture before completing the copolymerization, especially when the copolymer is of the type which is convertible to an insoluble, infusible material.

The catalyst used in my invention can be any of those conventionally used in free radical polymerization. Typical catalysts are the acyl peroxides, the alkyl and cycloalkyl peroxides, the alkyl and cycloalkyl hydroperoxides, the peroxy acids such as peroxybenzoic acid, the peroxy salts such as potassium peroxysulfate, and the decomposable azo compounds such as N,N'-azobis-(alpha-isobutyronitrile) (also called Porofor N).

The temperature at which the polymerization is carried out is governed by the particular catalyst used. For example, acetyl peroxide effects polymerization at about 40–50° C., benzoyl peroxide or Porofor N at about 50–80° C. and di-tert-butyl peroxide at about 125–140° C. The catalyst in turn is selected at the convenience of the operator. For instance, he might prefer to effect copolymerization with a very volatile comonomer at a low temperature so as to avoid using pressure equipment, whereas he might choose to copolymerize a less volatile comonomer at a higher temperature in the presence of a less explosive catalyst.

Throughout this application the general terms "copolymers," "heteropolymers," "copolymerization," "heteropolymerization," etc., refer to the polymers of or to the process of polymerization between one or more N-carbamylamic esters and one or more comonomers containing an ethylenic group CH₂=C<. Hereinafter, for simplicity, I shall refer broadly to a "monomer" or "comonomer" as if each were a single compound, whereas in fact each can be either a single compound or a mixture.

The proportion of N-carbamylamic ester to comonomer can be varied widely in order to change the properties of the copolymer to fit specific uses. As is shown in detail hereinafter, in general, copolymers made from a major amount of the said ester, especially one having a plurality of N-carbamylamic groups, and a minor amount of the comonomer are flexible, leathery materials, or even occasionally soft, almost liquid materials. As the proportion of the comonomer is increased the product gradually becomes tougher, then rigid, and often finally brittle when the proportion of the comonomer is very high. However, as shown hereinafter, a chemical change in either the N-carbamylamic ester or in the comonomer often changes the properties of the copolymer markedly, even though the proportion of the monomers is held constant. Therefore, no quantitative data which are applicable to all of the many copolymers covered by my invention can be given.

The proportion of the said ester to the comonomer is usually expressed as the "feed ratio." I have found that, within the limiting feed ratios given hereinafter, the ratio of the two monomers in a copolymer is usually substantially the same as that in the feed, provided that copolymerization is allowed to proceed as far as it will, i. e., that neither monomer remains to any extent unpolymerized. This is an especially valuable property which makes the copolymers of this invention suitable for a great variety of applications. It is, of course, well known that many copolymers are of the alternating type; i. e., that each of the two monomers will polymerize only with the other, but substantially never with itself. Consequently, no matter in what molar proportion the monomers are mixed, the copolymer is always substantially the same, and any excess of either monomer remains unpolymerized.

The N-carbamylamic esters, with the exception of the maleuric esters of castor oil, normally do not homopolymerize, by the method of my invention, to give useful products. However, copolymerization of such an ester with even a very small amount of a comonomer often forms valuable products. In general, the minimum amount of the comonomer is 5%, i. e., the feed ratio, N-carbamylamic ester: comonomer, is 95:5 (by weight). Preferably, the minimum amount of comonomer is 20%, equivalent to a feed ratio of 80:20.

The maximum amount of comonomer cannot be given broadly in a quantitative way, because the phenomenon of insolubility of one monomer in the other often makes it experimentally difficult, or even impossible, to form a satisfactory copolymer. For example, the alkyd dimaleurates described hereinafter normally are not compatible with styrene in all proportions. I have found that if the feed contains more than about 60–65% of styrene, the mixture separates into two liquid phases, one of which is almost pure styrene, before the copolymerization can go far enough to "freeze" the mixture, i. e., to copolymerize it to the gel point. Such products are usually opaque, likely because two different polymers which are not completely soluble in each other are formed. One of these polymers is believed to be essentially polystyrene, while the other is likely a copolymer. Such opaque products are generally less strong than closely corresponding clear products because there is probably structural weakness at the interface between the two solid phases.

It appears to be a general rule that, if the liquid mixture of the monomers separates rapidly into two phases, the solid copolymer made therefrom will be opaque, but the converse is not necessarily true. Often, a homogeneous monomer mixture will copolymerize to form turbid or opaque copolymers. This phenomenon is illustrated hereinafter. Many such copolymers are perfectly adequate in applications wherein clarity or transparency of the product is unimportant.

Some of the monomer mixtures used in my invention are compatible in all proportions. For example, a maleurate made from castor oil can be copolymerized with styrene in any desired proportion by my method, as shown hereinafter.

When a monomer mixture used in my invention forms a homogeneous solution in all proportions I prefer to use at least 5% of the N-carbamylamic ester, i. e., a feed ratio of at least 5:95. Copolymers of my invention containing as little as 5–10% of the said ester sometimes are much tougher, i. e., have a higher impact strength, than does the corresponding homopolymer, polystyrene being such a case. When, as I have pointed out, the two monomers used in making any of my new copolymers are compatible only within limited proportions, I prefer to use proportions within the compatible range because the polymerizing technique needed is simpler. This range can readily be determined for any monomer pair, of course, simply by mixing the monomers in various proportions, preferably at the temperature at which the copolymerization is to be carried out.

The following examples illustrate the preparation of esters useful in my invention, the parts being by weight:

*Example 1*

(a) A mixture of 203 parts of N-carbamylmaleimide and 320 parts of methanol was boiled under a reflux condenser for an hour. The solution was treated with decolorizing carbon and filtered while hot. It was then cooled to room temperature, causing the product to crystallize. After filtration and washing with alcohol the air-dried methyl N-carbamylmaleamate was obtained in 80% yield (200 parts) as a white solid melting at 110–113° C. After recrystallization from methanol it melted at 113–114° C.

(b) When N-carbamylmaleimide and excess methanol were mixed and allowed to stand at room temperature, with occasional shaking, the solid gradually disappeared within 12 hours. The homogeneous solution was evaporated to small volume at room temperature, causing the methyl N-carbamylmaleamate ("methyl maleurate") to crystallize in almost quantitative yield and in high purity.

(c) When a similar reagent mixture was stirred rapidly and continuously the reaction was completed within two hours at room temperature.

*Example 2*

A mixture of 11 parts of N-carbamylmaleimide, 80 parts of 2-propanol and 1 part of zinc chloride catalyst was boiled under reflux for an hour. Most of the excess alcohol was then removed by evaporation. The 2-propyl maleurate crystallized from the residue in the form of white glistening needles or powder, in high purity and almost quantitative yield. Melting point, 113–114° C.

*Example 3*

A mixture of equimolar amounts of N-carbamylmaleimide and 1-butanol was dissolved in p-dioxan (6 volumes per volume of the sum of the reagents). This solution was boiled under reflux for 16 hours. Most of the dioxan was then removed in vacuo, causing the n-butyl maleurate to crystallize. After recrystallization from carbon tetrachloride the white ester melted at 95–99° C. Yield, 47% of theory.

Examples 1 to 3 are illustrative of variations in the method of preparation of monomaleurates. As shown in copending application Serial No. 395,281, field November 30, 1953, the general method is operable in making maleurates of any compound containing a non-tertiary alcoholic hydroxyl group. Any of such monomaleurates can be copolymerized with compounds containing a terminal ethylenic group. Typical copolymers of monomaleurates are shown in Examples 26 to 33.

*Example 4*

A stirred mixture of AA grade raw castor oil (one mol), N-carbamylmaleimide (2.8 mols) and zinc chloride (0.1 mol) was heated at 100° C. for 6 hours. The mixture was then washed repeatedly at room temperature with aqueous sodium bicarbonate and then with water in order to remove any remaining N-carbamylmaleimide and zinc chloride. Nitrogen analysis of the viscous, tan, liquid product showed that it contained 2.0 maleuric groups per castor oil residue. Thus, on the average, the product was castor oil dimaleurate, although there presumably also was present some castor oil monomaleurate and castor oil trimaleurate. Hereinafter this product will be designated as "castor oil dimaleurate."

The product "dried" in the presence of cobalt and manganese naphthenates to form useful, hard varnish films. It also was found to be a suitable plasticizer for urea-formaldehyde resins.

*Examples 5–15*

The following examples illustrate the preparation of esters useful in my invention, made from alkyd resins having terminal carbinol groups.

N-carbamylmaleimide was reacted with each of the following alkyd resins, in the approximate molar proportion of 2:1, in the presence of zinc chloride (1.0% of the total weight of the reagents) for a few hours at 80–95° C.; i. e., until substantially all of the hydroxyl groups were converted to maleurate ester groups.

| Example | Alkyd Resin | Average Molecular Weight of Alkyd Resin |
|---|---|---|
| 5 | A. Phthalic anhydride:ethylene glycol | 1,475 |
| 6 | B. Phthalic anhydride:adipic acid; ethylene glycol | 770 |
| 7 | C. Succinic acid:diethylene glycol | 1,545 |
| 8 | D. Adipic acid:ethylene glycol:propylene glycol | 1,285 |
| 9 | E. Adipic acid:ethylene glycol:propylene glycol | 1,870 |
| 10 | F. Adipic acid:ethylene glycol:propylene glycol | 3,180 |
| 11 | G. Tetrachlorophthalic acid:adipic acid:ethylene glycol:glycerol | 2,140 |
| 12 | H. Sebacic acid:propylene glycol:glycerol | 1,790 |
| 13 | I. Adipic acid:ethylene glycol:diethylene glycol | 2,295 |
| 14 | J. 3,6-Endomethylene-tetrahydrophthalic anhydride:diethylene glycol | 1,535 |
| 15 | K. Maleic anhydride:adipic acid:diethylene glycol | 1,710 |

The products were viscous, clear, pale yellow to amber liquids, i. e., they looked almost like the unreacted alkyd resins.

The alkyd resins used in Examples 5–15 were made by the following well known general procedure:

A dicarboxylic acid, or mixture of such acids, was heated with more than an equimolar amount of a glycol or mixture of glycols [1] for several hours, i. e., until the acid number was almost zero. Throughout the heating an inert gas, e. g., nitrogen or carbon dioxide, was passed through the mixture in order to remove the water of esterification more rapidly and to protect the alkyd against the darkening effect of gaseous oxygen. Then the mixture was heated in vacuo in order to remove excess glycol. The hydroxyl content of the alkyd was determined, and from that the average molecular weight was calculated. The following table shows the details of the preparation of alkyds A to K by the above procedure.

| Alkyd | Reagents | | Products | |
|---|---|---|---|---|
| | Name | Amount (Moles) | Hydroxyl Content, Percent (By Weight) | Mol. Wt. |
| A | Phthalic anhydride | 3.0 | 2.31 | 1,475 |
| | Ethylene glycol | 4.2 | | |
| B | Phthalic anhydride | 2.0 | 4.42 | 770 |
| | Adipic acid | 2.0 | | |
| | Ethylene glycol | 5.6 | | |
| C | Succinic acid | 2.0 | 2.20 | 1,545 |
| | Diethylene glycol | 2.4 | | |
| D | Adipic acid | 5.7 | 2.65 | 1,285 |
| | Ethylene glycol | 5.6 | | |
| | Propylene glycol | 2.4 | | |
| E | Adipic acid | 5.7 | 1.75 | 1,870 |
| | Ethylene glycol | 5.6 | | |
| | Propylene glycol | 2.4 | | |
| F | Adipic acid | 5.7 | 1.07 | 3,180 |
| | Ethylene glycol | 5.6 | | |
| | Propylene glycol | 2.4 | | |
| G | Tetrachlorophthalic acid | 2.0 | 1.59 | 2,140 |
| | Adipic acid | 2.0 | | |
| | Ethylene glycol | 3.87 | | |
| | Glycerol | 0.63 | | |
| H | Sebacic acid | 4.0 | 1.90 | 1,790 |
| | Propylene glycol | 4.2 | | |
| | Glycerol | 0.4 | | |
| I | Adipic acid | 8.0 | 1.48 | 2,295 |
| | Ethylene glycol | 4.8 | | |
| | Diethylene glycol | 4.8 | | |
| J | 3,6-Endomethylene-tetrahydrophthalic anhydride | 4.0 | 2.22 | 1,535 |
| | Diethylene glycol | 4.8 | | |
| K | Maleic anhydride | 3.0 | 1.99 | 1,710 |
| | Adipic acid | 3.0 | | |
| | Diethylene glycol | 7.2 | | |

*Example 16*

A mixture of 11.2 parts of alkyd resin E, 2.0 parts of N-carbamylitaconimide, and 0.1 part of powdered an-

[1] Glycerol is broadly considered as a "glycol" herein, although it contains three hydroxyl groups (see especially alkyd G).

hydrous zinc chloride catalyst was heated and stirred for about 3 hours at 93–96° C. in order to effect esterification of substantially all of the hydroxyl groups.

The resulting di-itaconurate was a clear, pale yellow, viscous liquid.

*Example 17*

The experiment of Example 16 was repeated except that N-carbamylcitraconimide was used instead of N-carbamylitaconimide. The resulting di-citraconurate was a clear, yellow, viscous liquid.

*Examples 18–20*

These examples illustrate the preparation for use in my invention of esters from long-chain polyhydric alcohols containing sulfone groups in the chain. These alcohols are made by the following general method.

Metallic sodium (0.01 mol) was dissolved in a glycol (1.2 mol) at an elevated temperature, e. g., about 75–100° C. The solution was then cooled to room temperature. Divinyl sulfone (1.00 mol) was added gradually to the rapidly stirred solution. Usually, a vigorous exothermic reaction took place at once, but occasionally the mixture had to be heated gently to initiate the reaction. After the evolution of heat had ended, the solution was heated for several hours at an elevated temperature, e. g., overnight at 150° C., to complete the reaction. Three typical polymeric alcohols so formed are shown:

| Example | Glycol Used As Reagent | Average Molecular [1] Weight of Product |
|---|---|---|
| 18 | Diethylene Glycol | 1,000 |
| 19 | Pentamethylene Glycol | 1,300 |
| 20 | Octanediol-1,2 | 970 |

[1] Calculated from hydroxyl content.

The sulfur-containing glycols so made can be given the following idealized structure:

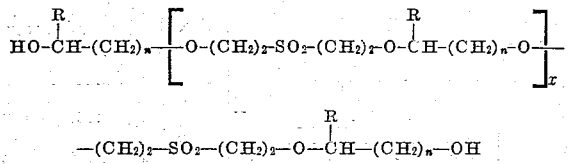

where R is hydrogen or an alkyl radical, and $n$ and $x$ are integers. (This structure is given only for illustration, and in no sense is a limitation of my invention.)

Each of these sulfur-containing glycols was mixed with slightly more than two molar proportions of N-carbamylmaleimide and about 1% (based on the total weight of the mixture) of finely divided anhydrous zinc chloride, and then heated at 100° C. for a few hours, i. e., for a sufficient time to form the dimaleurate. The products were clear, yellow to amber, viscous liquids.

*Examples 21–25.—Further examples of preparation of useful esters*

N-carbamylmaleimide was reacted with each of the following polyglycols, having the structure:

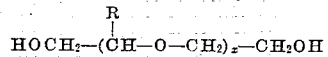

where R is hydrogen or methyl, and $x$ is an integer, in the approximate molar proportion of 2:1, in the presence of zinc chloride (0.2% of the total weight of the reagents) for a few hours at 90/95° C.; i. e., until substantially all of the hydroxyl groups were converted to maleurate ester groups.

| Example | Polyglycol | Average Molecular Weight |
|---|---|---|
| 21 | Polyethylene glycol | 600 |
| 22 | do | 6,000 |
| 23 | Polypropylene glycol | 750 |
| 24 | do | 1,200 |

*Example 25*

Alkali-refined soy bean oil was "blown," i. e., hydroxyl groups were formed at some of the points of olefinic unsaturation (and simultaneously the oil was polymerized somewhat), by bubbling a rapid stream of oxygen through it for 12 hours at 140° C. This reaction raised the viscosity (at 25° C.) from 0.5 poise initially to 12.9 poises. The blown oil contained 1.7% of hydroxyl groups.

A mixture of 500 parts of this blown oil, 50 parts of N-carbamylmaleimide and 4 parts of finely divided, anhydrous zinc chloride was heated at 93–94° C. for 8 hours, with stirring. The treated oil was filtered at room temperature to remove the zinc chloride and any unreacted N-carbamylmaleimide (these materials had been found to be substantially insoluble in the blown oil and in the maleurate ester product made from it). The filtered oil contained 1.68% nitrogen, thus showing that about 65% of the hydroxyl groups had been converted to maleurate ester groups.

The following example illustrates the preparation of the trans esters, subject of application Serial No. 395,284, typical of which are the N-carbamylfumaramates, the N-carbamylmesaconamates, the N-carbamyl-alpha-ethylfumaramates, and the N-carbamylmethylfumaramates:

*Example 26*

Anhydrous aluminum chloride (0.2 part) was added to a mixture of 5.0 parts of N-carbamylmaleimide and 50 parts of methanol. There was an immediate evolution of heat, and within a minute or two a white crystalline material precipitated. This material, methyl N-carbamylfumaramate, after recrystallization from water, melted at 228–230° C.

*Analysis.*—Calcd. for $C_6H_8N_2O_4$: nitrogen, 16.29%. Found: nitrogen, 16.18%.

Other trans N-carbamylamic esters that may be similarly prepared are ethyl N-carbamylfumaramate, n-propyl N-carbamylfumaramate, isopropyl N-carbamylfumaramate, n-butyl N-carbamylfumaramate, sec-butyl N-carbamylfumaramate, isobutyl N-carbamylfumaramate, n-amyl N-carbamylfumaramate, n-hexyl N-carbamylfumaramate, n-heptyl N-carbamylfumaramate, n-octyl N-carbamylfumaramate, 2-ethylhexyl N-carbamylfumaramate, n-decyl N-carbamylfumaramate, n-dodecyl N-carbamylfumaramate, n-tetradecyl N-carbamylfumaramate, n-hexadecyl N-carbamylfumaramate, n-octadecyl N-carbamylfumaramate, allyl N-carbamylfumaramate, methallyl N-carbamylfumaramate, 2-hydroxyethyl N-carbamylfumaramate, 2-ethoxyethyl N-carbamylfumaramate, 2-chloroethyl N-carbamylfumaramate, benzyl N-carbamylfumaramate, 2-(N'-morpholino)-ethyl N-carbamylfumaramate, 2-nitrobutyl N-carbamylfumaramate, ethylene bis-(N-carbamylfumaramate), propylene bis-(N-carbamylfumaramate), trimethylene bis-(N-carbamylfumaramate), mono- and bis-(N-carbamylfumaramates) of diethylene glycol, mono- and bis-(N-carbamylfumaramates) of alkyl resins having terminal hydroxyl groups, mono- and poly-(N-carbamylfumaramates) of castor oil, mono- and poly-(N-carbamylfumaramates) of "blown" oils, mono- and poly-(N-carbamylfumaramates) of cellulose, mono- and poly-(N-carbamylfumaramates) of starch, mono- and poly-(N-carbamylfumaramates) of glucose, mono- and poly-(N-carbamylfumaramates) of cellulose which has been partially esterified with carboxylic acids or their anhydrides, mono- and poly-(N-carbamyl-fumaramates) of sucrose, mono- and poly-(N-carbamyl-fumaramates) of cellulose which has been partially etherified, mono- and poly-(N-carbamylfumaramates) of polyvinyl alcohol, mono- and poly-(N-carbamylfumaramates) of partially hydrolyzed polyvinyl acetate, methyl N-carbamylmesaconamate, isopropyl N-carbamylmesaconamate, 2-ethylhexyl N-carbamylmesaconamate, n-octadecyl N-carbamylmesaconamate, allyl N-carbamylmesaconamate, 2-hydroxyethyl N-carbamylmesaconamate, benzyl N-carbamylmesaconamate, ethylene bis-(N-carbamylmesaconamate), methyl N-(methylcarbamyl)-fumaramate, isopropyl N-(methylcarbamyl)-fumaramate, methyl N-(n-butylcarbamyl)-fumaramate, isopropyl N-(n-butylcarbamyl)-fumaramate, benzyl N-(n-butylcarbamyl)-fumaramate, isopropyl N-(tert-butylcarbamyl)-fumaramate, allyl N-(tert-butylcarbamyl)-fumaramate, isopropyl N-(phenylcarbamyl)-fumaramate, benzyl N-(phenylcarbamyl)-fumaramate and n-propyl N-(phenylcarbamyl)-mesaconamate.

The following examples illustrate the heteropolymerization of typical N-carbamylamic esters according to my invention.

*Example 27*

A mixture of 20 parts of styrene, 20 parts of methyl maleurate, and 0.8 part of benzoyl peroxide in 40 parts of acetone was heated at 67° C. for 5 hours. The homogeneous liquid was then poured into vigorously stirred methanol to precipitate the white copolymer in powder form. The conversion was 29%. The copolymer was soluble in dioxan and contained 6.05% nitrogen. Intrinsic viscosity (in dioxan), 0.11.

*Example 28*

The experiment of Example 27 was repeated except that vinyl acetate was used instead of styrene. The copolymerization went more rapidly than that of Example 27, so that the reaction was stopped when insoluble copolymer began to form—after about 20 minutes. The solution was poured into rapidly stirred methanol. The white copolymer was insoluble in dioxan, but soluble in acetic acid. Conversion, 19%; nitrogen, 10.13%; intrinsic viscosity (in acetic acid), 0.49.

*Example 29*

A mixture of 15 parts of n-butyl maleurate, 35 parts of acrylonitrile, 100 parts of dioxan and 1.0 part of benzoyl peroxide was heated at 66° C. Because of the considerable evolution of heat and the formation of a precipitate, the reaction mixture was removed from the heating bath when the solution temperature had risen to 82° C. The hot mixture was then poured into rapidly stirred methanol. The fine, white copolymer was obtained in 10% conversion. It was soluble in dimethylformamide, but insoluble in most other organic solvents. Nitrogen, 24.9%; intrinsic viscosity (in dimethylformamide), 1.46.

*Example 30*

A mixture of 40 parts of methyl maleurate, 86.5 parts of vinyl chloride, 200 parts of acetone and 4.0 parts of Porofor N was heated in a stainless steel autoclave for 24 hours at 50–52° C. The autoclave was then chilled with Dry Ice, opened to the atmosphere, and allowed to warm to room temperature while excess vinyl chloride escaped. The residual liquid was then decanted from a solid material, and poured into rapidly stirred methanol to precipitate a tan solid (copolymer A) which was filtered, washed with methanol, and dried.

The solid material in the bottom of the autoclave was extracted with acetone, which dissolved part of it. The acetone extract was poured into methanol to precipitate a solid. This solid and the residue undissolved in acetone were combined to form a white, powdery solid (copolymer B).

The copolymers have the following properties:

| | Copolymer A | Copolymer B |
|---|---|---|
| Solubility | Sol. in dimethylformamide, dioxan, tetrahydrofurane; sl. sol. in acetone, butanone, acetic acid. | Sol. in dimethylformamide, tetrahydrofurane; sl. sol. in dioxan, butanone, acetic acid. |
| Yield | 8.8 parts | 10.0 parts. |
| Analysis: | | |
| nitrogen | 4.55% | 8.67%. |
| chlorine | 36.11% | 25.48%. |
| Intrinsic viscosity (in dimethylformamide). | 0.19 | 0.25. |

*Example 31*

A mixture of 10 parts of n-butyl maleurate, 15 parts of vinyl chloride, 100 parts of acetone and 0.5 part of Porofor N was treated like the mixture shown in Example 30. The homogeneous solution, which remained after the excess vinyl chloride had escaped, was poured into methanol. The white solid copolymer which precipitated was dried. It contained 7.89% nitrogen and had an intrinsic viscosity, in dimethylformamide, of 0.17.

*Example 32*

A mixture of 10 parts of isopropyl maleurate, 40 parts of allyl acetate, 1.0 part of benzoyl peroxide and 50 parts of dioxan was heated at 69–73° C. for 18 hours, and then the dioxan and excess allyl acetate were evaporated at room temperature because the copolymer was found to be soluble in methanol. The residue was extracted with warm water to remove the unreacted isopropyl maleurate. The copolymer which remained was dissolved in acetone and reprecipitated with water. The copolymer came out of the water as an almost colorless oil which solidified after vacuum drying. Conversion, 14%; intrinsic viscosity (in dimethylformamide), 0.05; soluble in most organic solvents. It contains 7.00% nitrogen, 54.62% carbon, and 6.98% hydrogen.

*Example 33*

The experiment shown in Example 32 was repeated except that n-butyl maleurate was used instead of isopropyl maleurate. This copolymer, like that of Example 32, precipitated from water as a pale yellow oil which solidified on vacuum drying. Conversion, 28%; intrinsic viscosity (in dimethylformamide), 0.06; soluble in most organic solvents. It contains 6.24% nitrogen, 55.85% carbon, and 7.04% hydrogen.

*Example 34*

A mixture of 10 parts of methyl maleurate, 40 parts of isobutylene, 40 parts of acetone, and 1.0 part of Porofor N was heated in a stainless steel autoclave for 19 hours at 50° C. Then the excess isobutylene was allowed to escape at low temperature, and the solid-liquid residue was poured into methanol in order to complete the precipitation of the copolymer as a fine white powder. Conversion, 19%; intrinsic viscosity (in dimethylformamide), 0.18; soluble in dimethylformamide and acetic acid. It contains 10.46% nitrogen, 50.96% carbon, and 7.13% hydrogen.

The resins described in Examples 27 to 34 form useful protective coatings and varnishes for covering metals, wood, etc., when dissolved in a suitable organic solvent. Some solvents are mentioned specifically in each example. The resins can also be molded or cast in the absence of a solvent, to form useful articles. However, such coatings and molded articles are useful only at moderate temperatures, i. e., in the temperature range within which polystyrene articles are used, because these resins are nonthermosetting. In other words, like polystyrene, they are not heat-convertible to insoluble, infusible materials because they were made from maleurate esters containing only a single ethylenic group.

The following examples illustrate the copolymerization of maleurate esters having multiple unsaturation, to form resins which can be "cured" or converted into insoluble, infusible materials. The copolymerizations described in the following examples were carried out, except as noted, in bulk to form castings. Each copolymer was a solid material which was formed in substantially quantitative yield, i. e., there appeared to be no liquid monomeric material remaining in the copolymer and none lost due to evaporation.

Example 35

A mixture of 70 parts of the alkyd dimaleurate of Example 5, 30 parts of styrene, and 1.5 parts of benzoyl peroxide was heated at 70° C. until it gelled, and was then further heated for 90 minutes at 110° C. to complete the copolymerization. The product was a clear, amber casting which was infusible and insoluble in the usual organic solvents. It had a Rockwell M hardness of 93, but was somewhat brittle.

Example 36

The experiment of Example 35 was repeated except that the alkyd dimaleurate of Example 6 was used instead of that of Example 5. This casting was similar to that of Example 35 in appearance, infusibility and insolubility. However, it was superior to that of Example 35 in being tough rather than brittle. Tensile strength 5130 p. s. i., elongation 4%, Rockwell L hardness 99.

Examples 35 and 36, like other examples hereinafter, show that copolymers of polymaleurates are superior in many important characteristics, e. g., heat stability and solvent resistance, to the copolymers made from monomaleurates. These two examples, as well as others hereinafter, also show that the properties of the copolymers can be varied to fit individual uses by using different dibasic acids in making the alkyd reagent.

Example 37

Several mixtures of styrene and the alkyd dimaleurate of Example 10 were copolymerized, in the presence of 2 parts of benzoyl peroxide per 100 parts of the mixture of the maleurate and styrene, for one hour at 60° C. followed by 1.5 hours at 80–90° C. The feed ratios of the monomers and the properties of the copolymers are as follows:

| Feed Ratio, Maleurate: Styrene | Properties of Copolymer | | | |
|---|---|---|---|---|
| | Color | Clarity | Toughness | Hardness |
| 95:5 | light yellow. | clear | easily torn | soft. |
| 80:20 | do | do | do | very flexible. |
| 70:30 | do | do | fairly easily torn. | Do. |
| 60:40 | do | do | tough | fairly flexible. |
| 50:50 | very light yellow. | do | very tough | Do. |
| 30:70 | white | opaque | somewhat brittle. | hard. |

This example shows that the proportion of these two monomers can be varied widely, and that the properties of the products of my invention can be tailored to fit individual applications. The example also shows that the maximum proportion of styrene which can be copolymerized with this particular dimaleurate, in the conventional method of bulk copolymerization, is about 70%.

Example 38

By the method used in Example 37, styrene and the alkyd dimaleurate of Example 9 were copolymerized in several feed ratios to form the following copolymers:

| Feed Ratio, Maleurate:Styrene | Properties of Copolymer | | | |
|---|---|---|---|---|
| | Tensile (p. s. i.) | Elongation (percent) | Flexural Modulus (p. s. i.) | Impact (Izod) |
| 70:30 | 430 | 390 | 1,010 | 7.8 |
| 60:40 | 950 | 460 | 3,030 | 13.7 |
| 55:45 | 1,950 | 460 | 8,650 | 15.3 |
| 50:50 | 2,550 | 430 | 19,500 | 15.6 |
| 40:60 | 2,270 | 280 | 28,600 | 7.0 |
| 30:70 | 3,800 | 60 | 122,000 | 0.14 |

All of these copolymers except the 30:70 one were clear. It is evident from this example that as the proportion of styrene in the copolymer is increased the copolymer changes gradually from a flexible material to a tough, rigid one. It is also evident that the formation of two solid phases, as shown by the opacity of the 30:70 copolymer, is accompanied by a rapid drop in impact strength. However, this impact strength of 0.14 is still somewhat higher than that of polystyrene (which is about 0.10).

Example 39

Styrene and the alkyd dimaleurate of Example 8 were copolymerized, as described in Example 37, to form the following copolymers:

| Feed Ratio, Maleurate: Styrene | Properties of Copolymer | | | |
|---|---|---|---|---|
| | Tensile (p. s. i.) | Elongation (percent) | Flexural Modulus (p. s. i.) | Impact (Izod) |
| 70:30 | 1,320 | 280 | (1) | (1) |
| 60:40 | 1,850 | 290 | 30,400 | 2.7 |
| 50:50 | 2,530 | 270 | 75,100 | 0.5 |
| 40:60 | 3,500 | 120 | 48,200 | 0.2 |

1 Too soft.

This example, like Example 38, shows that when the proportion of styrene exceeds the limit for formation of a clear copolymer, which in this system is just below 60% styrene, some of the properties of the copolymer begin to drop.

Comparison of Examples 37–39, in which the initial alkyd resins are alike, except for their molecular weights (3180, 1870, and 1285, respectively), shows that the character of the copolymers of this invention can be varied merely by changing the molecular weight of the alkyd. Thus, a maleurate made from an alkyd of relatively high molecular weight (Example 37) can be copolymerized with a greater proportion of styrene to form a clear product than can a maleurate made from an alkyd of much lower molecular weight (Example 39). On the other hand, the low-styrene copolymers made as shown in Example 39 are superior in tensile strength to the comparable ones made in Example 37. The copolymers of Example 38, having been made from an alkyd of intermediate molecular weight, have properties which fall between those of the comparable copolymers of Examples 37 and 39.

Example 40

The alkyd dimaleurate of Example 9 was copolymerized with vinyl acetate in several proportions by the process shown in Example 37 except that the mixtures were heated at 48–50° C. for 16 hours.

| Feed Ratio, Maleurate:Vinyl Acetate | Appearance of Copolymer |
|---|---|
| 90:10 | flexible, clear resin. |
| 80:20 | Do. |
| 70:30 | Do. |
| 60:40 | Do. |
| 50:50 | soft, flexible, clear resin. |

These castings recovered their original shape very quickly after being bent and released.

Example 41

The alkyd dimaleurate of Example 10 was copolymerized with each of several monomers by the method of Example 37 except that the temperature of polymerization was 52° C. and the time of polymerization was as shown below:

| Comonomer | Feed Ratio, Maleurate: Comonomer | Polymerization Time (Hrs.) | Properties of Copolymer | | |
|---|---|---|---|---|---|
| | | | Clarity | Toughness | Hardness |
| Acrylonitrile | 75:25 | 65 | opaque | tears easily | soft. |
| Diallyl phthalate | 75:25 | 65 | cloudy | fairly tough | somewhat flexible. |
| n-Butyl acrylate | 50:50 | 24 | do | tears easily | fairly soft. |

Examples 40 and 41 show that alkyd dimaleurates can be copolymerized with various unsaturated monomers.

Example 42

A mixture of 70 parts of the alkyd dimaleurate of Example 9, 30 parts of styrene and 2 parts of benzoyl peroxide was heated for 16 hours at 55° C. A second mixture, which was like the first except that it contained in addition 5 parts of diallyl fumarate, was also heated in the same way. Both mixtures copolymerized to form clear, flexible, tough castings. The one which contained diallyl fumarate was stiffer and had a better tear resistance than the other.

Example 42 shows that the properties of the products of this invention can be modified at will by copolymerizing a maleurate with a mixture of two other monomers.

Example 43

Mixtures of styrene with each of several alkyd dimaleurates were copolymerized as shown in Example 42. For contrast, mixtures of styrene with each of two of the alkyd resins from which the dimaleurates were made were heated in like manner in the presence of 2% of benzoyl peroxide. These two alkyd resins contained olefinic unsaturation contributed by the residues from carbic anhydride and maleic anhydride respectively. The feed ratio of alkyd:styrene was the same in each mixture as the feed ratio of the corresponding dimaleurate:styrene mixture. The benzoyl peroxide used in all of these mixtures was in the form of a paste, called Luperco ATC, consisting of equal weights of benzoyl peroxide and tricresyl phosphate.

| Maleurate | Feed Ratio, Maleurate:Styrene | Properties of the Copolymer | | |
|---|---|---|---|---|
| | | Clarity | Toughness | Hardness |
| Ex. 7 | 75:25 | opaque | fairly tough | flexible. |
| Ex. 11 | 50:50 | clear | do | Shore D 83. |
| Ex. 12 | 50:50 | do | tough | flexible. |
| Ex. 13 | 50:50 | do | do | Do. |
| Ex. 14 | 50:50 | do | slightly brittle | Shore D 79. |
| Ex. 15 | 80:20 | do | tough | rigid Shore D 74. |
| Ex. 15 | 50:50 | do | do | rigid Shore D 81. |

These castings swelled somewhat, but did not dissolve, on being suspended in benzene for 10 days. The alkyd dimaleurates were soluble in benzene.

The alkyd resins from which the dimaleurates of Examples 14 and 15 were made also were copolymerized with styrene to give the following results:

| Alkyd | Feed Ratio, Alkyd:Styrene | Clarity | Toughness | Hardness |
|---|---|---|---|---|
| J (Ex. 14) | 50:50 | opaque | brittle and tears easily. | Shore D 35. |
| K (Ex. 15) | 80:20 | clear | tears fairly easily | somewhat flexible. |
| K (Ex. 15) | 50:50 | do | fairly tough | rigid Shore D 73. |

Comparison of any of the copolymers made, according to this invention, from a dimaleurate with the conventional copolymer made from the corresponding unsaturated alkyd shows, in every case, that my new copolymer is superior in toughness and hardness to the conventional copolymer.

This example also illustrates the use of several other alkyd dimaleurates in my invention. Incidentally, none of the alkyd resins A through I are copolymerizable with ethylenic monomers because these alkyd resins are not olefinically unsaturated.

Example 44

A mixture of 10 parts of the alkyd dimaleurate of Example 9, 10 parts of 2-methyl-5-vinylpyridine, and 0.8 part of Luperco ATC was heated at 70° C. for 16 hours. The casting so formed was clear, tough and rigid, had a Shore D hardness of 63, and was insoluble in the common organic solvents.

Example 45

The alkyd di-itaconurate of Example 16 was copolymerized separately with styrene and with diallyl fumarate in the proportion 60 parts of di-itaconurate, 40 parts of comonomer, with 4 parts of Luperco ATC by heating at 70° C. for 16 hours. The casting of the styrene copolymer was opaque, tough, and flexible. The casting of the diallyl fumarate copolymer was rigid, somewhat brittle, and almost clear. Neither copolymer was soluble in or swelled to any extent by benzene.

Example 46

The alkyd dicitraconurate of Example 17 was copolymerized with styrene as described in Example 45. The casting was opaque, soft, and insoluble in benzene.

Examples 35–46 illustrate the broad flexibility of my invention as applied to the copolymerization of di-(n-carbamylamates) of many varieties of alkyd resins having terminal hydroxyl groups.

Examples 47 and 48 illustrate the copolymerization of di-(N-carbamylamates) of other long-chain materials having terminal hydroxyl groups.

Example 47

Each of the polyalkylene glycol dimaleurates described in Examples 21–24 was copolymerized with styrene, in the feed ratio 70:30, by heating in the presence of 1.5% of benzoyl peroxide at 70° C. until gelled, and then at 110° C. for 90 minutes. The properties of the castings were as follows:

| Dimaleurate | Properties of Copolymer | | |
|---|---|---|---|
| | Tensile (p. s. i.) | Elongation (percent) | Hardness (Shore A) |
| Example 21 | 1,050 | 110 | 94 |
| Example 22 | | (¹) | |
| Example 23 | 525 | 110 | 87 |
| Example 24 | 270 | 150 | 64 |

¹ Brittle, solid, not tested.

These copolymers are insoluble in the usual organic solvents.

Example 48

Each of the three dimaleurates of Examples 18–20 (made from the reaction product of divinyl sulfone and a glycol) was copolymerized with styrene and with vinyl acetate, in the feed ratios shown, by heating in the presence of Luperco ATC for 16 hours at 50–60° C., to form the following castings:

| Dimaleurate | Comonomer | Feed Ratio | Luperco ATC (parts) | Properties of Copolymer | |
|---|---|---|---|---|---|
| | | | | Toughness | Hardness |
| Example 18 | styrene | a 90:10 | 0.8 | brittle | hard, rigid. |
| Do | vinyl acetate | b 75:25 | 6 | tough | somewhat flexible. |
| Example 19 | styrene | a 54:64 | 4 | do | Shore D 69. |
| Do | vinyl acetate | b 73:27 | 5.7 | do | Shore D 40. |
| Example 20 | styrene | 50:50 | 4 | fairly brittle | Shore D 83. |
| Do | vinyl acetate | 50:50 | 4.5 | tough | flexible. | a The maximum amount of styrene which would dissolve in the dimaleurate at room temperature.
b The maximum amount of vinyl acetate which would dissolve in the dimaleurate at room temperature.

These castings are insoluble in the usual organic solvents, whereas the dimaleurates are soluble in the more polar ones.

An attempt was made to copolymerize styrene and vinyl acetate separately with the divinyl sulfone-pentamethylene glycol reaction product from which the dimaleurate of Example 19 was made. Each mixture (50:50 feed ratio) was heated for 16 hours at 70° C. in the presence of 2 parts of Luperco ATC. A white, opaque, weak, crumbly solid was obtained when styrene was used, whereas a clear viscous oil was obtained when vinyl acetate was used. Both products were soluble in the usual organic solvents. These experiments show that useful, insoluble polymers are obtained only when N-carbamylamate groups are present in these sulfone-containing materials.

The following examples show that polymaleurates made from compounds having non-terminal alcoholic hydroxyl groups also form insoluble, infusible copolymers which are useful as castings and coatings.

*Example 49*

The polymaleurate mixture made by reaction between castor oil and N-carbamylmaleimide, as shown in Example 4, was copolymerized individually with several comonomers in varying feed ratios, in the presence of 2 parts of benzoyl peroxide by heating for several hours at 55–60° C., except as noted. The castings have the following properties.

| Comonomer | Maleurate: Comonomer | Properties of the Copolymer | | |
|---|---|---|---|---|
| | | Clarity | Toughness | Hardness |
| Styrene | 85:15 | clear | tough | flexible. |
| Do | 80:20 | do | do | somewhat flexible. |
| Do | 50:50 | do | do | rigid, hard. |
| Do | 30:70 | cloudy | brittle | Do. |
| Do | 20:80 | opaque | do | Do. |
| Diallyl phthalate | 50:50 | cloudy | tears easily | very flexible. |
| Acrylonitrile | 67:33 | opaque | do | soft. |
| Vinyl acetate a | 80:20 | clear | do | Do. |
| Do.a | 50:50 | do | do | fairly flexible. |
| Do.a | 50:50 | opaque | do | flexible. | a Copolymerized for 90 minutes at 60° C., and then for 90 minutes at 80–90° C.

These copolymers are insoluble in the usual organic solvents.

*Example 50*

A mixture of 50 parts of the blown soya oil polymaleurate of Example 25 with 50 parts of styrene and 2 parts of benzoyl peroxide was heated at 60° C. for 16 hours. For contrast, the raw soya oil and the blown soya oil respectively were heated in the same way with styrene and benzoyl peroxide. The casting made from the maleurate, according to my invention, was a clear, flexible, tough solid which was insoluble in the usual organic solvents. The other two mixtures formed opaque, white liquids which were soluble in many organic solvents.

It is evident from this example that natural oils which are incapable of copolymerizing with styrene to form insoluble, useful products can be easily converted to materials which copolymerize to form valuable new products by the method of my invention.

Having thus described my invention, what I claim and desire to protect by Letters Patent is:

1. An interpolymer of an alpha-olefinic N-carbamylamic acid ester of a compound containing a non-tertiary alcoholic hydroxyl group with a copolymerizable ethylenic compound containing at least one terminal ethylenic group and in which, in the case of a plurality of such groups, said groups are non-conjugated with each other.

2. An interpolymer as set forth in claim 1, in which the ester has the general formula

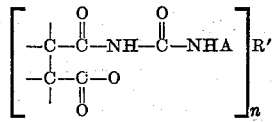

where A is selected from the class consisting of hydrogen and a hydrocarbon radical, and any two of the dangling valences are satisfied by a member selected from the class consisting of hydrogen and acyclic hydrocarbon and the remaining two dangling valences are so arranged that the molecule contains one $>C=C<$ connected to at least one of the carbonyl groups; $R'$ is the alcohol radical of a non-tertiary alcohol compound; and $n$ is an integer.

3. An interpolymer as set forth in claim 1, in which the alcohol compound is a monohydric non-tertiary carbinol.

4. An interpolymer as set forth in claim 1, in which the alcohol compound is an aliphatic polyol containing a non-tertiary alcoholic hydroxyl group.

5. An interpolymer as set forth in claim 4, in which the aliphatic polyol is an alkyd.

6. An interpolymer as set forth in claim 1, in which the N-carbamylamic acid is selected from the class consisting of N-carbamylmaleamic acid, N-carbamylitaconamic acid, and N-carbamylcitraconamic acid.

7. An interpolymer of maleuric acid ester of an aliphatic polyol containing a non-tertiary alcoholic hydroxyl group with a copolymerizable ethylenic compound containing at least one terminal ethylenic group and in which, in the case of a plurality of such groups, said groups are non-conjugated with each other.

8. An interpolymer as set forth in claim 7, in which the polyol is castor oil.

9. A polymerizate of a maleuric acid ester of castor oil.

10. An interpolymer as set forth in claim 7, in which the aliphatic polyol is an alkyd resin having terminal alcoholic groups and the ester is a di-ester.

No references cited.